United States Patent
Finney

(10) Patent No.: US 8,424,800 B2
(45) Date of Patent: Apr. 23, 2013

(54) MULTI-SOURCE EMERGENCY POWER OPTIMIZATION

(75) Inventor: Adam M. Finney, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 296 days.

(21) Appl. No.: 12/821,255

(22) Filed: Jun. 23, 2010

(65) Prior Publication Data

US 2011/0315815 A1   Dec. 29, 2011

(51) Int. Cl.
*B64D 25/00*   (2006.01)
*B64D 41/00*   (2006.01)

(52) U.S. Cl.
USPC .......................................... 244/58; 244/53 R

(58) Field of Classification Search ............ 244/58, 244/59, 60, 53 R
See application file for complete search history.

(56) References Cited

U.S. PATENT DOCUMENTS

| | | | |
|---|---|---|---|
| 3,887,817 A | 6/1975 | Steelman | |
| 4,864,812 A | 9/1989 | Rodgers et al. | |
| 4,865,267 A | 9/1989 | Severson | |
| 4,912,921 A | 4/1990 | Rice et al. | |
| 4,934,136 A | 6/1990 | Weigand et al. | |
| 5,136,838 A | 8/1992 | Shekleton et al. | |
| 5,209,056 A | 5/1993 | Shekleton et al. | |
| 5,385,011 A | 1/1995 | Stewart, Jr. | |
| 5,867,979 A | 2/1999 | Newton et al. | |
| 6,254,034 B1 | 7/2001 | Carpenter | |
| 6,344,700 B1 | 2/2002 | Eisenhauer et al. | |
| 6,463,738 B1 * | 10/2002 | Pinkerton et al. | ............... 60/646 |
| 6,467,725 B1 | 10/2002 | Coles et al. | |
| 6,568,633 B2 | 5/2003 | Dunn | |
| 6,614,142 B1 | 9/2003 | Bonnieman et al. | |
| 6,914,345 B2 | 7/2005 | Webster | |
| 6,993,915 B2 | 2/2006 | Kung et al. | |
| 7,307,403 B2 | 12/2007 | Sarlioglu et al. | |
| 7,309,974 B2 | 12/2007 | Sarlioglu et al. | |
| 7,364,116 B2 * | 4/2008 | Nguyen et al. | ................. 244/58 |
| 7,372,175 B2 | 5/2008 | Bouiller et al. | |
| 7,468,561 B2 | 12/2008 | Kern et al. | |
| 7,605,483 B2 | 10/2009 | Kern et al. | |
| 2006/0137355 A1 | 6/2006 | Welch et al. | |
| 2008/0110151 A1 | 5/2008 | Welch et al. | |
| 2008/0200299 A1 | 8/2008 | Russ | |
| 2009/0121546 A1 * | 5/2009 | Langlois et al. | ................ 307/23 |
| 2010/0008764 A1 | 1/2010 | Baltas et al. | |

FOREIGN PATENT DOCUMENTS

| | | |
|---|---|---|
| EP | 1947311 A2 | 7/2008 |
| EP | 1959114 A2 | 8/2008 |
| WO | 2008/045068 A1 | 4/2008 |
| WO | WO 2008065065 A1 * | 6/2008 |

OTHER PUBLICATIONS

SAE Aerospace; Aerospace Information Report, Aerospace Auxiliary Power Sources, AIR744B, Sep. 19, 2008.

* cited by examiner

*Primary Examiner* — Tien Dinh
*Assistant Examiner* — Richard R Green
(74) *Attorney, Agent, or Firm* — Carlson, Gaskey & Olds, P.C.

(57) ABSTRACT

A disclosed emergency power system includes multiple emergency power devices that are each sized to provide partial power during emergency operation and/or full power for a portion of emergency operation.

20 Claims, 1 Drawing Sheet

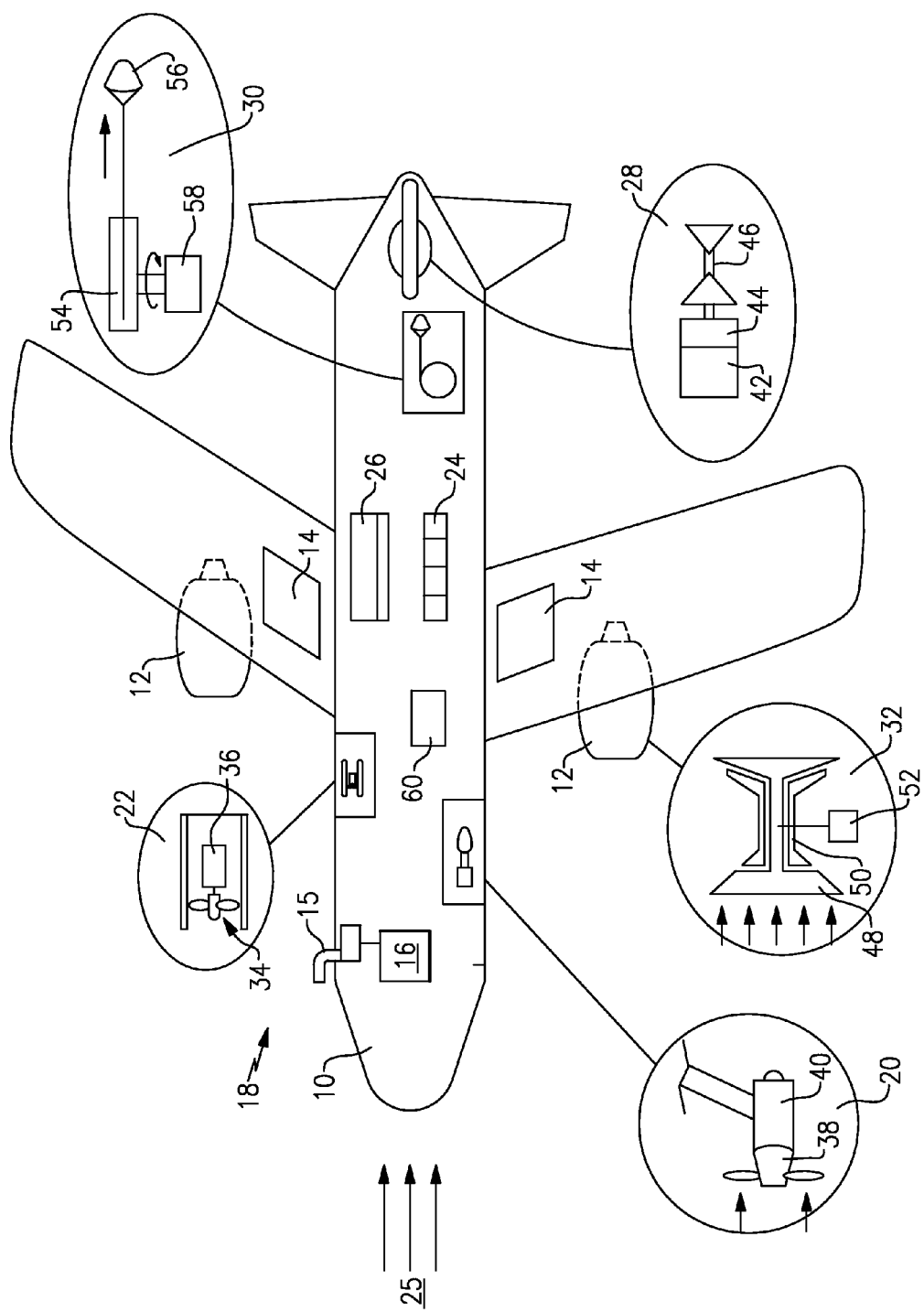

MULTI-SOURCE EMERGENCY POWER OPTIMIZATION

BACKGROUND

This disclosure generally relates to emergency power systems that provide power to systems of an air vehicle in the absence of power produced by primary power sources. More particularly, this disclosure relates to a system and method for utilizing power from multiple secondary power sources in the absence of power from the primary power source.

An air vehicle includes a primary power source such as a gas turbine engine that can produce not only thrust to propel the vehicle but also electrical and hydraulic power to actuate and run various on-board systems. Such systems can include navigation devices, environmental controls, along with any other system that is utilized on-board an air vehicle for controlling and directing the air vehicle. Emergency power can be provided by many different devices including those generating power from the environment, such as a ram air turbine assembly. Moreover, emergency power may also be provided by storing energy such as is accomplished by using electricity drawn from batteries or converting fuel into energy through the use of a power conversion device. Each form of emergency power has advantages that are tempered by costs that affect normal air vehicle performance. Such costs, for example, include weight, space and complexity.

SUMMARY

A disclosed emergency power system includes multiple emergency power devices that are each sized to provide partial power during emergency operation and/or full power for a portion of emergency operation. The example emergency power system includes power conversion devices and energy storage devices. A controller detects operating parameters of the air vehicle such as air speed and altitude to select which of the various emergency power devices are actuated. The controller also actuates the emergency devices according to a defined hierarchy such that some of the devices are actuated before other devices to most effectively utilize available emergency energy.

These and other features disclosed herein can be best understood from the following specification and drawings, the following of which is a brief description.

BRIEF DESCRIPTION OF THE DRAWINGS

FIG. 1 is a schematic view of an air vehicle including example secondary energy converting and storing devices.

DETAILED DESCRIPTION

Referring to FIG. 1, an example air vehicle 10 includes primary gas turbine engines 12 that provide thrust and power generation during standard operation. The example air vehicle 10 is an airplane although other air vehicles including fixed and rotary wing aircraft will benefit from the disclosed system and method. The example air vehicle 10 includes an emergency power system schematically indicated at 18 that includes a controller 16 and multiple emergency power sources. The controller 16 controls actuation of energy storage and energy conversion devices mounted on-board the air vehicle 10.

Throughout this disclosure the term 'emergency power source' is utilized to describe all non-primary gas turbine engine 12 power devices and the term 'energy storage device' is utilized to describe a device that carries energy on-board the air vehicle 10 in some form. Additionally, the term 'energy conversion' is used to describe a device that does not carry energy on-board, but instead relies on the ambient environment to produce energy.

During normal operation the primary gas turbine engines 12 provide the required power, both electric and hydraulic, by converting chemical energy stored within fuel carried in fuel tanks 14. In the event that the primary gas turbine engines 12 fail to produce sufficient power, the controller 16 engages the emergency energy storage and energy conversion devices to provide the desired energy.

An air vehicle 10 is required to provide a power source independent of the primary gas turbine engines 12. One example of an independent power source is a ram air turbine (RAT) 20 that can produce electrical power. The RAT 20 is deployed into the airstream 25 along the exterior of the air vehicle 10 to spin a turbine 38. The turbine 38 in turn drives a generator 40 to produce electric power. As appreciated, although generator 40 is schematically shown, the turbine 38 could also drive a hydraulic pump to provide hydraulic power used to control the air vehicle 10.

The RAT 20 performs well when sufficient air speed is present to turn the turbine 38. Although a RAT 20 can be configured to include larger air foil surfaces and adjustment mechanism to perform at lower air speeds, such additional capabilities incur weight and complexity costs. However, the use of a smaller RAT that performs as desired within a limited flight envelop may be more beneficial. Accordingly, an air vehicle 10 equipped with a smaller RAT 20 with limited capability would provide power at the higher air speeds. However, once the air vehicle 10 dropped below a sufficient air speed and/or altitude to drive the RAT 20 and provide the desired amount of power, the example emergency power system 18 could actuate or engage one of several additional and different energy converting and energy storing power sources that are selectively actuated depending on specific circumstances and operating conditions. The controller 16 operates each of the emergency power sources individually or in combination in view of ambient conditions and particular features of each emergency power source.

The example emergency power system 18 includes power conversion devices such as the RAT 20, a ram fan 22, a low spool generator 32, and a momentum powered flywheel 30.

The example ram fan 22 uses the airstream 25 to drive a fan 34 that in turn drives a motor/generator 36. In normal operation, the motor/generator 36 drives the fan; however, the motor/generator 36 can be driven by the fan 34 to generate power. The ram fan 22 therefore uses the airstream 25 along the air vehicle 10 to generate power. Similarly, the low spool generator 32 produces power using the airstream 25 produced due to the speed and altitude of the air vehicle 10. The example low spool generator 32 operates once the primary gas turbine engine 12 ceases to operate normally. Once the gas turbine engine 12 stops operating normally, the low spool 48 is coupled to a generator 52. The low spool 48 rotates independent of the high spool 50 responsive to airflow through the gas turbine engine 12 to drive a generator 52.

The example emergency power system 18 also includes energy storage devices including batteries 24, fuel cell 26, an accumulator 60 and an auxiliary power unit (APU) 28 that utilizes fuel converted to mechanical energy by a gas turbine engine 46 that drives a generator 42 through a gearbox 44. Although the APU 28 converts fuel into mechanical energy used to drive the generator 42, it still is an energy storage device because the APU 28 requires fuel carried aboard the air vehicle 10 as opposed to the energy conversion devices that generate energy from sources not carried aboard the air vehicle 10.

Although several example energy conversion and energy storage devices are schematically shown, other energy storage and conversion devices are also within the contemplation of this disclosure. Moreover, the air vehicle 10 may only include one or a few of each of the disclosed and illustrated emergency power sources.

Each of the on-board emergency energy devices perform optimally in different circumstances and therefore the controller 16 detects the current ambient and operational conditions of the air vehicle 10 as communicated through various sensors schematically shown at 15, and actuates a selected one or a combination of several on-board emergency energy devices. In this example, the controller 16 uses operating parameters of the air vehicle 10 such as air speed and altitude to select which of the various emergency power devices are actuated. Additionally, the current operating parameter could include current or power draw from a system of the air vehicle, a distance from a desired location such as a landing site, weight of the air vehicle and current environmental conditions. Further, the controller 16 also determines a hierarchy of emergency power devices such that some of the devices are actuated before other devices to optimize and lengthen the total period of power generation.

In operation, when a loss of power occurs with the air vehicle 10 operating at cruising altitude and speed, the controller 16 engages one or a combination of several of the power conversion devices such as the RAT 20, ram fan 22, and low spool generator 32. The high speed and high altitude provide the proper environment for the power conversion devices to operate. Moreover, because the power conversion devices can generate power, they are not limited by what can be physically carried aboard the air vehicle 10 and can operate for extended periods.

In contrast, in the event of a loss of power from the primary gas turbine engines 12 at lower altitudes and air speeds, such as for example during take off or landing, it would be preferable to have immediately available power that does not require deployment as may be required by devices such as the RAT 20. Moreover, the energy storing devices such as the batteries 24, accumulator 60 and the fuel cell 26 can provide immediate power.

The controller 16 may actuate several of the emergency energy devices concurrently or separately in a desired sequence. For example, for emergency power requirements that occur at cruising altitude and air speed, initially an energy conversion device such as the RAT 20 is actuated to provide power. As air speed and altitude decrease and the RAT 20 becomes less efficient at producing power, batteries 24 or the fuel cell 26 can be actuated to supplement power produced by the RAT 20. The batteries 24 include only limited amounts of power and once drained stops providing power. Therefore, power is drawn from the batteries 24 to supplement power for short periods.

If at any time an emergency power source is generating more power than required by the air vehicle 10, the excess power is used to charge or otherwise replenish the stored energy sources. For example, if more electric energy is being produced by the RAT 20 than is required, that excess power can be utilized to charge the batteries 24. Moreover, the RAT 20 may also be utilized to generate hydraulic pressure to run hydraulic air vehicle systems. Excess pressure can be utilized to recharge the accumulator 60. The example accumulator 60 can store fluid or air under pressure for use in air vehicle systems.

Once the batteries 24 or other power storing device is depleted, an immediate power-converting device such as the momentum-powered flywheel 30 can be actuated to provide the last amounts of required power. In this example, the momentum-powered flywheel 30 is actuated by releasing a chute 56 into the airstream 25 to begin rotation of a flywheel 54. The physical configuration of the flywheel 54 maintains momentum and drives a generator 58 to provide short term additional electric power. Thereby, the controller 16 sequentially actuates different emergency energy devices according to a defined hierarchy that increases the efficiency and period in which emergency energy is provided.

Accordingly, the disclosed emergency power system 18 includes multiple emergency power devices that are each sized to provide partial power during emergency operation and/or full power for a portion of emergency operation.

Although an example embodiment has been disclosed, a worker of ordinary skill in this art would recognize that certain modifications would come within the scope of this disclosure. For that reason, the following claims should be studied to determine the scope and content of this invention.

What is claimed is:

1. A method of providing emergency power in an air vehicle comprising the steps of:
providing an energy storing device aboard an air vehicle;
providing an energy conversion device aboard the air vehicle;
determining that a primary power supply is not providing a desired amount of power;
determining a current operating parameter of the air vehicle; and
actuating one of the energy storing device and the energy conversion device responsive to the current operating parameter to provide power including engaging the energy storing device to provide immediate power without using the energy conversion device to perform an energy conversion in response to the current operating parameter comprising a speed of the air vehicle being below a desired threshold.

2. The method as recited in claim 1, wherein the current operating parameter comprises at least one of a speed of the air vehicle and an altitude of the air vehicle.

3. The method as recited in claim 1, wherein the current operating parameter comprises at least one of a current draw from an air vehicle system, a distance to a suitable landing location, air vehicle weight and current environmental conditions.

4. The method as recited in claim 1, wherein the energy storing device comprises at least one of a battery, a fuel cell and a fuel tank.

5. The method as recited in claim 1, wherein the energy conversion device comprises at least one of a ram air turbine, a generator, an auxiliary power unit, and a rotating wheel.

6. The method as recited in claim 1, including engaging the energy conversion device in response to the current operating parameter comprising an altitude of the air vehicle being above a desired threshold.

7. The method as recited in claim 1, including engaging the energy conversion device in response to the current operating parameter and subsequently engaging the energy-storing device responsive to a change in the current operating parameter meeting a threshold value.

8. The method as recited in claim 7, wherein each of the energy conversion devices and the energy storage devices provide a portion of the power desired for operation of the air vehicle.

9. The method as recited in claim 1, wherein the emergency power sources are depleted according to a predetermined hierarchy.

10. The method as recited in claim 9, wherein the emergency power conversion devices are depleted prior to using the energy storage devices.

11. A method of providing emergency power in an air vehicle comprising the steps of:
providing an energy storing device aboard an air vehicle;
providing an energy conversion device aboard the air vehicle;
determining that a primary power supply is not providing a desired amount of power;
determining a current operating parameter of the air vehicle; and
actuating one of the energy storing device and the energy conversion device responsive to the current operating parameter to provide power, including engaging the energy conversion device in response to the current operating parameter comprising a speed of the air vehicle being above a desired threshold.

12. The method as recited in claim 11, including engaging the energy storing device to provide immediate power without using the energy conversion device to perform an energy conversion in response to the current operating parameter comprising a speed of the air vehicle being below a desired threshold.

13. An air vehicle emergency power system comprising:
an energy storing device;
a secondary energy conversion device; and
a controller for selectively engaging the energy storing device and the secondary energy conversion device responsive to determining that a primary energy conversion device of an air vehicle is not providing a desired amount of power and selecting one of the energy storage device and the secondary energy conversion device responsive to a current operating parameter of the air vehicle, wherein the controller actuates one of the energy storage devices and energy conversion devices based on a predefined hierarchy responsive to a speed of the air vehicle.

14. The air vehicle emergency power system as recited in claim 13, wherein the energy storing device comprises at least one of a battery, a fuel cell and a fuel tank.

15. The air vehicle emergency power system as recited in claim 13, wherein the secondary energy conversion device comprises at least one of a ram air turbine, a ram fan, an auxiliary power unit, and a rotating flywheel.

16. The air vehicle emergency power system as recited in claim 13, including a sensor in communication with the controller for providing information indicative the current operating parameter of the air vehicle.

17. The air vehicle emergency power system as recited in claim 16, wherein the current operation parameter comprises at least one of a speed and altitude.

18. The air vehicle emergency power system as recited in claim 13, wherein the controller actuates one of the energy storage devices and energy conversion devices based on a desired hierarchy responsive to the current operating parameter of the air vehicle.

19. The air vehicle emergency power system as recited in claim 13, wherein the controller engages the energy conversion device in response to the current operating parameter comprising a speed of the air vehicle being above a desired threshold.

20. The air vehicle emergency power system as recited in claim 13, wherein the controller engages the energy storage device to provide immediate power without using the energy conversion device to perform an energy conversion in response to a speed of the air vehicle being below a desired threshold.

* * * * *